(12) United States Patent
Funk et al.

(10) Patent No.: US 9,803,033 B2
(45) Date of Patent: *Oct. 31, 2017

(54) METHOD FOR REMOVING METAL IMPURITIES

(75) Inventors: Rüdiger Funk, Niedernhausen (DE); Jürgen Schröder, Ludwigshafen (DE); Thomas Pfeiffer, Böhl-Iggelheim (DE); Emil Bitzer, Rödersheim-Gronau (DE)

(73) Assignee: BASF SE, Ludwigshafen (DE)

(*) Notice: Subject to any disclaimer, the term of this patent is extended or adjusted under 35 U.S.C. 154(b) by 745 days.

This patent is subject to a terminal disclaimer.

(21) Appl. No.: 13/266,181

(22) PCT Filed: Apr. 19, 2010

(86) PCT No.: PCT/EP2010/055100
§ 371 (c)(1),
(2), (4) Date: Oct. 25, 2011

(87) PCT Pub. No.: WO2010/124954
PCT Pub. Date: Nov. 4, 2010

(65) Prior Publication Data
US 2012/0041152 A1    Feb. 16, 2012

(30) Foreign Application Priority Data
Apr. 30, 2009  (EP) .................... 09159155

(51) Int. Cl.
  C08F 2/10    (2006.01)
  B03C 1/28    (2006.01)
  C08F 6/02    (2006.01)

(52) U.S. Cl.
  CPC ........... *C08F 2/10* (2013.01); *B03C 1/286* (2013.01); *C08F 6/02* (2013.01); *B03C 2201/18* (2013.01)

(58) Field of Classification Search
  CPC ........ B03C 2201/18; B03C 1/286; C08F 2/10
  See application file for complete search history.

(56) References Cited

U.S. PATENT DOCUMENTS

| | | | |
|---|---|---|---|
| 4,162,855 A * | 7/1979 | Bender | 366/274 |
| 4,865,915 A * | 9/1989 | Okonogi et al. | 428/336 |
| 5,597,873 A * | 1/1997 | Chambers et al. | 525/330.1 |
| 5,669,894 A | 9/1997 | Goldman et al. | |
| 6,414,214 B1 | 7/2002 | Engelhardt et al. | |
| 6,716,894 B2 | 4/2004 | Kajikawa et al. | |
| 7,507,475 B2 | 3/2009 | Inger et al. | |
| 7,714,061 B2 | 5/2010 | Riegel et al. | |
| 8,026,315 B2 | 9/2011 | Riegel et al. | |
| 8,258,223 B2 | 9/2012 | Riegel et al. | |
| 2003/0087983 A1 * | 5/2003 | Kajikawa et al. | 522/150 |
| 2011/0251353 A1 * | 10/2011 | Funk | 525/329.7 |

FOREIGN PATENT DOCUMENTS

| | | |
|---|---|---|
| EP | 0 780 424 A1 | 6/1997 |
| EP | 855 232 A2 | 7/1998 |
| EP | 1 118 633 A2 | 7/2001 |
| EP | 1 422 257 A1 | 5/2004 |
| EP | 1 462 473 A1 | 9/2004 |
| EP | 1 721 663 A1 | 11/2006 |
| EP | 1 754 725 A2 | 2/2007 |
| EP | 2 135 669 A1 | 12/2009 |
| JP | 09124879 A | 5/1997 |
| JP | 2000323310 A | 11/2000 |
| JP | 2004016957 A | 1/2004 |
| JP | 2004172446 A | 6/2004 |
| JP | 2004345804 A | 12/2004 |
| WO | WO-97/37695 A1 | 10/1997 |
| WO | WO-98/49221 A1 | 11/1998 |
| WO | WO-01/25290 A1 | 4/2001 |
| WO | WO-01/74913 A1 | 10/2001 |
| WO | WO-2005/080479 A1 | 9/2005 |
| WO | WO-2005/092955 A1 | 10/2005 |
| WO | WO-2006/058682 A1 | 6/2006 |
| WO | WO-2006/103227 A1 | 10/2006 |
| WO | WO-2008/120742 A1 | 10/2008 |

OTHER PUBLICATIONS

Bakker Magnetics Brochure (2004).*
Buchholz, Fredric L., et al.. *Modern Superabsorbent Polymer Technology*, "Commercial Processes for the Manufacture of Superabsorbent Polymers," pp. 71-103. New York: John Wiley & Sons, Inc., 1998.
International Search Report in international application No. PCT/EP2010/055100, dated Jun. 7, 2010 (English translation).
"Measurement and Control," vol. 30, No. 6 (Jun. 1991), pp. 519-528 (with partial translation).
Nippon Magnetics USA, Inc., *Power Permanent Magnetic Bars*, Usage temperature specified in a catalogue of metal remover (with partial translation).
Nippon Magnetics USA, Inc., "Electric and Permanent [Dry & Wet] Magnetic Separators," excerpt from catalog (2005) (with partial translation).
Excerpt from Funtai Gijyutsu Soran (Particle Technique Directory) 2004/2005 (2004) (with partial translation).
Excerpt from Catalogue of "Eriez Magnetics Japan Co., Ltd.".
Inda and Edana, Worldwide Strategic Partners, "Standard Test Methods for the Nonwoven Industry," WSP 230.2(05)A (first edition), 2005.

* cited by examiner

*Primary Examiner* — Mark Kaucher
(74) *Attorney, Agent, or Firm* — Marshall, Gerstein & Borun LLP

(57) ABSTRACT

A process for removing metallic impurities from a product mass flow comprising water-absorbing polymer particles by means of bar magnets, wherein the water-absorbing polymer particles comprise a surfactant and have direct contact with the bar magnets.

12 Claims, No Drawings

METHOD FOR REMOVING METAL IMPURITIES

CROSS-REFERENCE TO RELATED APPLICATIONS

This is the U.S. national phase of International Application No. PCT/EP2010/055100, filed Apr. 19, 2010, which claims the benefit of European patent Application No. 0 915 9155.2, filed Apr. 30, 2009.

The present invention relates to a process for removing metallic impurities from a product mass flow comprising water-absorbing polymer particles by means of bar magnets, wherein the water-absorbing polymer particles comprise a surfactant and have direct contact with the bar magnets.

Water-absorbing polymer particles are used to produce diapers, tampons, sanitary napkins and other hygiene articles, but also as water-retaining agents in market gardening. The water-absorbing polymer particles are also referred to as superabsorbents.

The production of water-absorbing polymer particles is described in the monograph "Modern Superabsorbent Polymer Technology", F. L. Buchholz and A. T. Graham, Wiley-VCH, 1998, pages 71 to 103.

The properties of the water-absorbing polymer particles can be adjusted, for example, via the amount of crosslinker used. With increasing amount of crosslinker, the centrifuge retention capacity (CRC) falls and the absorption under a pressure of 21.0 g/cm$^2$ (AUL0.3 psi) passes through a maximum.

To improve the application properties, for example permeability of the swollen gel bed (SFC) in the diaper and absorption under a pressure of 49.2 g/cm$^2$ (AUL0.7 psi), water-absorbing polymer particles are generally surface postcrosslinked. This increases the degree of crosslinking of the particle surface, which allows the absorption under a pressure of 49.2 g/cm$^2$ (AUL0.7 psi) and the centrifuge retention capacity (CRC) to be at least partly decoupled. This surface postcrosslinking can be performed in the aqueous gel phase. Preferably, however, dried, ground and sieved-off polymer particles (base polymer) are surface coated with a surface postcrosslinker, thermally surface postcrosslinked and dried. Crosslinkers suitable for this purpose are compounds which can form covalent bonds with at least two carboxylate groups of the water-absorbing polymer particles.

EP 1 422 257 A1 describes a process for removing impurities from a product mass flow comprising water-absorbing polymer particles by means of a magnetic separator.

It was an object of the present invention to provide an improved process for producing water-absorbing polymer particles, more particularly a high deposition rate of metallic impurities and easy cleaning of the magnetic separator used for that purpose.

The object is achieved by a process for producing water-absorbing polymer particles by polymerizing a monomer solution or suspension comprising a) at least one ethylenically unsaturated monomer which bears acid groups and may be at least partly neutralized, b) at least one crosslinker, c) at least one initiator, d) optionally one or more ethylenically unsaturated monomers copolymerizable with the monomers specified under a) and e) optionally one or more water-soluble polymers, metallic impurities being removed from a product mass flow comprising water-absorbing polymer particles by means of a magnetic separator, the magnetic separator being formed from bar magnets, the bar magnets consisting of a sleeve and a magnetic material present within the sleeve, and the sleeve being bonded to the magnetic material in an undetachable manner, wherein the sleeves may have direct contact to the water-absorbing polymer particles and said water-absorbing polymer particles comprise at least one surfactant.

The sleeve is bonded to the magnetic material in an undetachable manner, which means that the magnetic material for cleaning the bar magnets cannot be removed from the sleeve or cannot be removed from the sleeve without damage to the bar magnet.

The magnetic material used in the bar magnets consists typically of a plurality of individual magnets stacked one on top of another. The magnetic field strength of an individual magnet decreases with the distance from the magnet poles. Use of a plurality of individual magnets allows the region of low magnetic field strength to be minimized.

The sleeves are typically made from austenitic steel, for example steel of materials number 1.4404 to DIN EN 10020. However, other materials, such as polytetrafluoroethylene, are also suitable.

Since the sleeves increase the distance of the magnetic material from the outer surface of the bar magnets, the magnetic field strength effective at the outer surface thus also falls. Excessively thick sleeves should therefore be avoided. On the other hand, the sleeves should have sufficient mechanical stability.

For the process according to the invention, all anionic, cationic, nonionic and amphoteric surfactants are suitable. Surfactants lower the interfacial tension and are capable of micellization. A definition of surfactants can be found in Römpp Chemie Lexikon on page 4497 (ISBN 3-13-102759-2).

Suitable surfactants are, for example, sorbitan monoesters such as sorbitan monococoate and sorbitan monolaurate, or ethoxylated variants thereof, for example Polysorbate 20, which is sold under the Tween® 20 brand name (ICI Americas Inc., Wilmington, US). Further very suitable surfactants are the ethoxylated and alkoxylated derivatives of 2-propylheptanol, which are sold under the Lutensol® XL and Lutensol® XP brand names (BASF SE, Ludwigshafen, Germany).

The surfactant may already be added to the monomer solution or suspension. However, it is more advantageous to add the surfactant before, during or after the surface postcrosslinking, for which the mixers customary for applying the surface postcrosslinker are suitable. Particularly advantageously, the surfactant is not added until immediately upstream of the magnetic separator.

The amount of surfactant used in the process according to the invention depends on the site of addition. The surfactant may, for example, already be added to the monomer solution. However, it is also possible to add the surfactant together with the surface postcrosslinker or in the course of remoisturization. The site of addition, however, has a crucial influence on the effective amount of surfactant on the surface of the water-absorbing particles. At the same time, the surfactant present on the surface of the water-absorbing particles is particularly effective in the process according to the invention.

When the surfactant, for example, is already added to the monomer solution, the amount of the surfactant used, based on the water-absorbing polymer particles, is preferably 0.005 to 0.2% by weight, more preferably 0.02 to 0.1% by weight, most preferably 0.04 to 0.06% by weight.

When the surfactant, for example, is added with the surface postcrosslinker, the amount of the surfactant used, based on the water-absorbing polymer particles, is preferably 0.001 to 0.1% by weight, more preferably 0.002 to 0.05% by weight, most preferably 0.005 to 0.02% by weight.

When the surfactant, for example, is added in the course of remoisturization, the amount of the surfactant used, based on the water-absorbing polymer particles, is preferably 0.0005 to 0.05% by weight, more preferably 0.001 to 0.02% by weight, most preferably 0.002 to 0.01% by weight.

The surfactant for use in accordance with the invention also influences the surface tension of the aqueous extract of the swollen water-absorbing polymer particles. Too low a surface tension increases the surface moisture of the diapers after liquid loading and should therefore be avoided. The amount of surfactant used should be selected such that the surface tension of the aqueous extract of the swollen water-absorbing polymer particles at 23° C. is preferably at least 0.06 N/m, more preferably at least 0.065 N/m, most preferably at least 0.072 N/m. The surface tension of the aqueous extract of the swollen water-absorbing polymer particles is determined by the method described in WO 2006/042704 A2 (page 25 lines 29 to 37).

During operation, the bar magnets become laden with metallic impurities and adhering water-absorbing polymer particles and therefore have to be cleaned regularly. To this end, the bar magnets are removed from the product mass flow, and the adhering metallic impurities and water-absorbing polymer particles are removed, for example by means of a vacuum cleaner. A disadvantage here is that the bar magnets can thus be cleaned only with very great difficulty.

For easier cleaning, bar magnets in additional, detachable sleeves made from a nonmagnetizable material, for example stainless steel, can be used. Material deposited on the additional sleeves can be removed easily by pulling out the bar magnets. Such systems are obtainable, for example, under the name EASY CLEAN cleanability system (S+S Separation and Sorting Technology GmbH, Schönberg, Germany). A disadvantage here is that the magnetic field strength at the active surface and hence the deposition rate decrease as a result of the use of the additional sleeves.

The present invention is based on the finding that bar magnets can be cleaned very easily by means of a vacuum cleaner when the water-absorbing polymer particles comprise a surfactant. The use of additional, detachable sleeves for improved cleaning is no longer necessary.

The temperature of the product mass flow is preferably from 30 to 90° C., more preferably from 40 to 80° C., most preferably from 50 to 70° C.

The moisture content of the water-absorbing polymer particles in the product mass flow is preferably from 1 to 20% by weight, more preferably from 2 to 10% by weight, most preferably from 2.5 to 5% by weight, and is determined by the EDANA recommended test method No. WSP 230.2-05 "Moisture Content".

The use of magnetic separators in the production of water-absorbing polymer particles leads to increased abrasion owing to the additional mechanical stress. The magnetic separation is frequently the last process step in the production of water-absorbing polymer particles. This abraded material is therefore not removed and hence worsens the product properties.

The mechanical stability of the water-absorbing polymer particles can be increased significantly by heat treatment and additionally by establishment of a minimum moisture content. Excessively high temperatures, in contrast, weaken the magnetic field.

Excessively high moisture contents in conjunction with excessively high temperatures should, in contrast, be avoided, since the tack of the water-absorbing polymer particles increases in this case.

When the water-absorbing polymer particles are thermally aftertreated at relatively high temperatures, for example greater than 160° C., for example for surface postcrosslinking, the water-absorbing polymer particles have a very low moisture content. It is therefore advantageous to increase the moisture content of the water-absorbing polymer particles upstream of the magnetic separator.

The moisture content is typically increased by adding water or aqueous solutions in suitable mixing devices. Any possible tendency of the water-absorbing polymer particles to form lumps can be prevented by a higher speed of the mixing tools used. Further parameters influencing the tendency to form lumps are the temperature of the water-absorbing polymer particles and the ionic strength of the aqueous solution used for moistening. The tendency to form lumps decreases with rising temperature and rising ionic strength.

The bar magnets used typically have a magnetic flux density of at least 0.6 T, more preferably of at least 0.9 T, most preferably of at least 1.1 T.

The bar magnets of the magnetic separator are typically present directly in the product stream line. The product stream line is not subject to any restrictions. Suitable product stream lines are, for example, pipelines in which the water-absorbing polymer particles are conveyed pneumatically or gravimetrically. The diameter of the product stream line is preferably from 5 to 50 cm, more preferably from 15 to 40 cm, most preferably from 20 to 35 cm.

The flow through the magnetic separator is advantageously from the top downward. It is possible in this context that the water-absorbing polymer particles are conducted through the magnetic separator essentially owing to their own weight.

The distance between the bar magnets should be selected such that a sufficient gap is available for the product stream and, on the other hand, a sufficient separation rate is ensured.

The diameter of the bar magnets is preferably from 5 to 30 mm, more preferably from 5 to 20 mm, most preferably from 5 to 10 mm. The gap width between the bar magnets is preferably from 5 to 30 mm, more preferably from 8 to 25 mm, most preferably from 10 to 20 mm.

Advantageously, a plurality of bar magnets are arranged alongside one another and offset, one on top of another. This increases the separation rate of the magnetic separator.

The areal loading of the magnetic separator is preferably from 2 to 15 g/cm$^2$s, more preferably from 4 to 12 g/cm$^2$s, most preferably from 6 to 8 g/cm$^2$s. The areal loading is the product mass in g which passes the cross-sectional area of 1 cm$^2$ at right angles to the product flow direction in 1 s.

In the case of too low an areal loading, metallic impurities can be conducted past the bar magnets in laminar flow. In the case of too high an areal loading, it is possible for already separated metallic impurities to be knocked off the bar magnets again.

The product mass flow may additionally also comprise a gas stream, for example air or technical grade nitrogen. The gas stream has a water content of preferably less than 5 g/kg, more preferably of less than 4 g/kg, most preferably of less than 3 g/kg.

Too high a rate of product mass flow likewise lowers the deposition rate of the magnetic separator.

Advantageously, an eddy current detector is used additionally in the process according to the invention. Eddy current detectors are suitable for detecting ferritic and nonferritic metallic impurities. Such impurities may arise, for example, through abrasion of plant parts which are in contact with the product and are made from ferritic or austenitic steels.

Suitable materials for the plant parts in contact with the product are austenitic steels with, for example, at least 0.08% by weight of carbon. The austenitic steels advantageously comprise, as well as iron, carbon, chromium, nickel and optionally molybdenum, also further alloy constituents, preferably niobium or titanium.

The preferred materials are materials with materials number 1.45xx according to DIN EN 10020, where xx may be a natural number between 0 and 99. Particularly preferred materials are the steels with materials numbers 1.4541 and 1.4571, especially steel with materials number 1.4541.

An eddy current detector generates a magnetic alternating field, which builds up, in metals, a magnetic field opposite to the magnetic field generated by the eddy current detector, which alters the original magnetic alternating field to a measurable degree.

The eddy current detector can be calibrated by means of a test body composed of a nonferritic metallic material, for example a stainless steel ball with a diameter of 3.5 mm.

The adaptor for the eddy current detector in the product stream line is of course made of a nonmetallic material, preferably ceramic.

In the process according to the invention, the additional eddy current detector can be used at various sites. However, it is particularly advantageous to use it immediately upstream of the product silo or the dispensing station.

The ferritic and nonferritic metallic impurities detected by means of the eddy current detector can be discharged, for example into an off-spec silo by means of a diverter present in the product line.

The water-absorbing polymer particles are produced by polymerizing a monomer solution or suspension and are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, preferably at least 10 ppm by weight, more preferably at least 30 ppm by weight, especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraalloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably 0.05 to 1.5% by weight, more preferably 0.1 to 1% by weight, most preferably 0.3 to 0.6% by weight, based in each case on monomer a). With rising crosslinker content, the centrifuge retention capacity (CRC) falls and the absorption under a pressure of 21.0 g/cm$^2$ passes through a maximum.

The initiators c) used may be all compounds which generate free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight, most preferably from 50 to 65% by weight. It is also possible to use monomer suspensions, i.e. monomer solutions with excess monomer a), for example sodium acrylate. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen, and the polymerization inhibitor present in the monomer solution can be deactivated, before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. Polymerization on a belt is described, for example, in DE 38 25 366 A1 and U.S. Pat. No. 6,241,928. Polymerization in a belt reactor forms a polymer gel, which has to be comminuted in a further process step, for example in an extruder or kneader.

However, it is also possible to dropletize an aqueous monomer solution and to polymerize the droplets obtained in a heated carrier gas stream. This allows the process steps of polymerization and drying to be combined, as described in WO 2008/040715 A2 and WO 2008/052971 A1.

The acid groups of the resulting polymer gels have typically been partially neutralized. Neutralization is preferably carried out at the monomer stage. This is typically done by mixing in the neutralizing agent as an aqueous solution or preferably also as a solid. The degree of neutralization is preferably from 25 to 95 mol %, more preferably from 30 to 80 mol %, most preferably from 40 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the polymer gel formed in the polymerization. It is also possible to neutralize up to 40 mol %, preferably 10 to 30 mol % and more preferably 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The polymer gel is then preferably dried with a belt drier until the residual moisture content is preferably 0.5 to 15% by weight, more preferably 1 to 10% by weight, most preferably 2 to 8% by weight, the residual moisture content being determined by EDANA recommended test method No. WSP 230.2-05 "Moisture Content". In the case of too high a residual moisture content, the dried polymer gel has too low a glass transition temperature $T_g$ and can be processed further only with difficulty. In the case of too low a residual moisture content, the dried polymer gel is too brittle and, in the subsequent comminution steps, undesirably large amounts of polymer particles with an excessively low particle size are obtained (fines). The solids content of the gel before the drying is preferably from 25 to 90% by weight, more preferably from 35 to 70% by weight, most preferably from 40 to 60% by weight. Optionally, it is, however, also possible to use a fluidized bed drier or a paddle drier for the drying operation.

Thereafter, the dried polymer gel is ground and classified, and the apparatus used for grinding may typically be single- or multistage roll mills, preferably two- or three-stage roll mills, pin mills, hammer mills or vibratory mills.

The mean particle size of the polymer particles removed as the product fraction is preferably at least 200 μm, more preferably from 250 to 600 μm, very particularly from 300 to 500 μm. The mean particle size of the product fraction may be determined by means of EDANA recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of at least 150 µm is preferably at least 90% by weight, more preferably at least 95% by weight, most preferably at least 98% by weight.

Polymer particles with too small a particle size lower the permeability (SFC). The proportion of excessively small polymer particles (fines) should therefore be small.

Excessively small polymer particles are therefore typically removed and recycled into the process. This is preferably done before, during or immediately after the polymerization, i.e. before the drying of the polymer gel. The excessively small polymer particles can be moistened with water and/or aqueous surfactant before or during the recycling.

It is also possible in later process steps to remove excessively small polymer particles, for example after the surface postcrosslinking or another coating step. In this case, the excessively small polymer particles recycled are surface postcrosslinked or coated in another way, for example with fumed silica.

When a kneading reactor is used for polymerization, the excessively small polymer particles are preferably added during the last third of the polymerization.

When the excessively small polymer particles are added at a very early stage, for example actually to the monomer solution, this lowers the centrifuge retention capacity (CRC) of the resulting water-absorbing polymer particles. However, this can be compensated, for example, by adjusting the amount of crosslinker b) used.

When the excessively small polymer particles are added at a very late stage, for example not until in an apparatus connected downstream of the polymerization reactor, for example to an extruder, the excessively small polymer particles can be incorporated into the resulting polymer gel only with difficulty. Insufficiently incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 µm is preferably at least 90% by weight, more preferably at least 95% by weight, most preferably at least 98% by weight.

Advantageously, the proportion of particles having a particle size of at most 600 µm is preferably at least 90% by weight, more preferably at least 95% by weight, most preferably at least 98% by weight.

Polymer particles with too great a particle size lower the swell rate. The proportion of excessively large polymer particles should therefore likewise be small.

Excessively large polymer particles are therefore typically removed and recycled into the grinding of the dried polymer gel.

To further improve the properties, the polymer particles can be surface postcrosslinked. Suitable surface postcrosslinkers are compounds which comprise groups which can form covalent bonds with at least two carboxylate groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239,230.

Additionally described as suitable surface postcrosslinkers are cyclic carbonates in DE 40 20 780 C1, 2-oxazolidone and its derivatives, such as 2-hydroxyethyl-2-oxazolidone in DE 198 07 502 A1, bis- and poly-2-oxazolidinones in DE 198 07 992 C1, 2-oxotetrahydro-1,3-oxazine and its derivatives in DE 198 54 573 A1, N-acyl-2-oxazolidones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and its derivatives in WO 2003/031482 A1.

Preferred surface postcrosslinkers are glycerol, ethylene carbonate, ethylene glycol diglycidyl ether, reaction products of polyamides with epichlorohydrin, and mixtures of propylene glycol and 1,4-butanediol.

Very particularly preferred surface postcrosslinkers are 2-hydroxyethyloxazolidin-2-one, oxazolidin-2-one and 1,3-propanediol.

In addition, it is also possible to use surface postcrosslinkers which comprise additional polymerizable ethylenically unsaturated groups, as described in DE 37 13 601 A1.

The amount of surface postcrosslinkers is preferably 0.001 to 2% by weight, more preferably 0.02 to 1% by weight, most preferably 0.05 to 0.2% by weight, based in each case on the polymer particles.

In a preferred embodiment of the present invention, polyvalent cations are applied to the particle surface in addition to the surface postcrosslinkers before, during or after the surface postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate and aluminum lactate are preferred. Apart from metal salts, it is also possible to use polyamines as polyvalent cations.

The amount of polyvalent cation used is, for example, 0.001 to 1.5% by weight, preferably 0.005 to 1% by weight, more preferably 0.02 to 0.8% by weight, based in each case on the polymer particles.

The surface postcrosslinking is typically performed in such a way that a solution of the surface postcrosslinker is sprayed onto the dried polymer particles. After the spraying, the polymer particles coated with surface postcrosslinker are dried thermally, and the surface postcrosslinking reaction can take place either before or during the drying.

The spraying of a solution of the surface postcrosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; US) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The content of nonaqueous solvent and/or total amount of solvent can be used to adjust the penetration depth of the surface postcrosslinker into the polymer particles.

When exclusively water is used as the solvent, a surfactant is advantageously added. This improves the wetting performance and reduces the tendency to form lumps. However, preference is given to using solvent mixtures, for example isopropanol/water, 1,3-propanediol/water and propylene glycol/water, where the mixing ratio is preferably from 20:80 to 40:60.

The thermal drying is preferably carried out in contact driers, more preferably paddle driers, most preferably disk driers. Suitable driers are, for example, Hosokawa Bepex® horizontal paddle driers (Hosokawa Micron GmbH; Leingarten; Germany), Hosokawa Bepex® disk driers (Hosokawa Micron GmbH; Leingarten; Germany) and Nara paddle driers (NARA Machinery Europe; Frechen; Germany). Moreover, it is also possible to use fluidized bed driers.

The drying can be effected in the mixer itself, by heating the jacket or blowing in warm air. Equally suitable is a downstream drier, for example a shelf drier, a rotary tube oven or a heatable screw. It is particularly advantageous to mix and dry in a fluidized bed drier.

Preferred drying temperatures are in the range of 100 to 250° C., preferably 120 to 220° C., more preferably 130 to 210° C., most preferably 150 to 200° C. The preferred residence time at this temperature in the reaction mixer or drier is preferably at least 10 minutes, more preferably at least 20 minutes, most preferably at least 30 minutes, and typically at most 60 minutes.

Subsequently, the surface postcrosslinked polymer particles can be classified again, excessively small and/or excessively large polymer particles being removed and recycled into the process.

To further improve the properties, the surface postcrosslinked polymer particles can be coated or subsequently moistened. Suitable coatings for improving the swell rate and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The water-absorbing polymer particles produced by the process according to the invention have a moisture content of preferably 0 to 15% by weight, more preferably 0.2 to 10% by weight, most preferably 0.5 to 8% by weight, the water content being determined by EDANA recommended test method No. WSP 230.2-05 "Moisture Content".

The water-absorbing polymer particles produced by the process according to the invention have a centrifuge retention capacity (CRC) of typically at least 15 g/g, preferably at least 20 g/g, preferentially at least 22 g/g, more preferably at least 24 g/g, most preferably at least 26 g/g. The centrifuge retention capacity (CRC) of the water-absorbing polymer particles is typically less than 60 g/g. The centrifuge retention capacity (CRC) is determined by EDANA recommended test method No. WSP 241.2-05 "Centrifuge Retention Capacity".

The water-absorbing polymer particles produced by the process according to the invention have an absorption under a pressure of 49.2 g/cm² of typically at least 15 g/g, preferably at least 20 g/g, preferentially at least 22 g/g, more preferably at least 24 g/g, most preferably at least 26 g/g.

The absorption under a pressure of 49.2 g/cm² of the water-absorbing polymer particles is typically less than 35 g/g. The absorption under a pressure of 49.2 g/cm² is determined analogously to EDANA recommended test method No. WSP 242.2-05 "Absorption under Pressure", except that a pressure of 49.2 g/cm² is established instead of a pressure of 21.0 g/cm².

The water-absorbing polymer particles are tested by means of the test methods described below.

Methods:

The measurements should, unless stated otherwise, be carried out at an ambient temperature of 23±2° C. and a relative air humidity of 50±10%. The water-absorbing polymer particles are mixed thoroughly before the measurement.

Saline Flow Conductivity

The saline flow conductivity (SFC) of a swollen gel layer under a pressure of 0.3 psi (2070 Pa) is, as described in EP 0 640 330 A1, determined as the gel layer permeability of a swollen gel layer of water-absorbing polymer particles, the apparatus described on page 19 and in FIG. 8 in the aforementioned patent application having been modified to the effect that the glass frit (40) is not used, and the plunger (39) consists of the same polymer material as the cylinder (37) and now comprises 21 bores of equal size distributed homogeneously over the entire contact area. The procedure and evaluation of the measurement remain unchanged from EP 0 640 330 A1. The flow is detected automatically.

The saline flow conductivity (SFC) is calculated as follows:

$$SFC[cm^3 s/g]=(Fg(t=0) \times L0)/(d \times A \times WP)$$

where Fg(t=0) is the flow of NaCl solution in g/s, which is obtained using linear regression analysis of the Fg(t) data of the flow determinations by extrapolation to t=0, L0 is the thickness of the gel layer in cm, d is the density of the NaCl solution in g/cm³, A is the area of the gel layer in cm², and WP is the hydrostatic pressure over the gel layer in dyn/cm².

Moisture Content

The moisture content of the water-absorbing polymer particles is determined by EDANA recommended test method No. WSP 230.2-05 "Moisture content".

Centrifuge Retention Capacity

The centrifuge retention capacity (CRC) is determined by EDANA recommended test method No. WSP 241.2-05 "Centrifuge Retention Capacity".

Absorption Under a Pressure of 49.2 g/cm²

The absorption under a pressure of 49.2 g/cm² (AUL0.7 psi) is determined analogously to the EDANA (European Disposables and Nonwovens Association) recommended test method No. WSP 242.2-05 "Absorption under Pressure", except that a pressure of 49.2 g/cm² (AUL0.7 psi) is established instead of a pressure of 21.0 g/cm² (AUL0.3 psi).

The EDANA test methods are obtainable, for example, from EDANA, Avenue Eugène Plasky 157, B-1030 Brussels, Belgium.

EXAMPLES

Example 1 (Comparative Example)

By continuously mixing deionized water, 50% by weight sodium hydroxide solution and acrylic acid, an acrylic acid/sodium acrylate solution was prepared, such that the degree of neutralization corresponded to 71.3 mol %. The solids content of the monomer solution was 38.8% by weight.

The polyethylenically unsaturated crosslinker used was polyethylene glycol-400 diacrylate (diacrylate proceeding from a polyethylene glycol with a mean molar mass of 400 g/mol). The amount used was 2 kg of crosslinker per t of monomer solution.

To initiate the free-radical polymerization, per t of monomer solution, 1.03 kg of a 0.25% by weight aqueous hydrogen peroxide solution, 3.10 kg of a 15% by weight aqueous sodium peroxodisulfate solution and 1.05 kg of a 1% by weight aqueous ascorbic acid solution were used.

The throughput of the monomer solution was 20 t/h. The reaction solution had a temperature of 23.5° C. at the feed.

The individual components were metered in the following amounts continuously into a List Contikneter continuous kneader reactor with a capacity of 6.3 m$^3$ (LIST AG, Arisdorf, Switzerland):

| | |
|---|---|
| 20 t/h | of monomer solution |
| 40 kg/h | of polyethylene glycol-400 diacrylate |
| 82.6 kg/h | of hydrogen peroxide solution/sodium peroxodisulfate solution |
| 21 kg/h | of ascorbic acid solution |

Between the addition point for the crosslinker and the addition sites for the initiators, the monomer solution was inertized with nitrogen.

After approx. 50% of the residence time, a metered addition of fines (1000 kg/h) which were obtained from the production process by grinding and sieving into the reactor additionally took place. The residence time of the reaction mixture in the reactor was 15 minutes.

The resulting polymer gel was placed onto a belt dryer. On the belt dryer, an air/gas mixture flowed continuously around the polymer gel and dried it. The residence time in the belt dryer was 37 minutes.

The dried polymer gel was ground and sieved off to a particle size fraction of 150 to 850 μm. The resulting base polymer was surface postcrosslinked.

In a Schugi Flexomix® (Hosokawa Micron B.V., Doetinchem, the Netherlands), the base polymer was coated with a surface postcrosslinker solution and then dried in a NARA paddle dryer (GMF Gouda, Waddinxveen, the Netherlands) at 155° C. for 45 minutes.

The following amounts were metered into the Schugi Flexomix®:

| | |
|---|---|
| 7.5 t/h | of base polymer |
| 308.25 kg/h | of surface postcrosslinker solution |

The surface postcrosslinker solution comprised 2.7% by weight of Denacol EX-810 (ethylene glycol diglycidyl ether), 24.3% by weight of propylene glycol and deionized water.

After drying, the surface postcrosslinked base polymer was cooled to approx. 60° C. in a NARA paddle cooler (GMF Gouda, Waddinxveen, the Netherlands) and then sieved off again to a particle size fraction of 150 to 850 μm.

The resulting water-absorbing polymer particles had a moisture content of 0.9% by weight, a centrifuge retention capacity (CRC) of 30.1 g/g, an absorption under pressure (AUL0.7 psi) of 23.0 g/g and a saline flow conductivity (SFC) of $45 \times 10^{-7}$ cm$^3$s/g.

The product mass flow was conducted in free fall through a magnetic separator. The diameter of the product flow line was 30 cm. The magnetic separator consisted of 4 removable cassettes arranged one on top of another. The bar magnets were arranged one on top of another in two offset rows in each cassette. The upper row in each case consisted of four bar magnets, the lower in each case of three. The diameter of the bar magnets was 25 mm, the horizontal gap width between two bar magnets was 30 mm and the vertical gap width between two bar magnets was 30 mm.

The bar magnets were cleanable with a vacuum cleaner only with very great difficulty.

Example 2

The procedure was as in example 1. The surface postcrosslinker solution additionally comprised 0.24% by weight of sorbitan monolaurate (Span® 20, ICI Americas Inc. Wilmington, US).

The bar magnets were cleanable easily with a vacuum cleaner.

The invention claimed is:

1. A process for producing water-absorbing polymer particles by polymerizing a monomer solution or suspension comprising
   a) at least one ethylenically unsaturated monomer which bears an acid group and may be at least partly neutralized,
   b) at least one crosslinker,
   c) at least one initiator,
   d) optionally one or more ethylenically unsaturated monomer copolymerizable with the monomer specified under a), and
   e) optionally one or more water-soluble polymer,
   metallic impurities being removed from a product mass flow comprising water-absorbing polymer particles by a magnetic separator, the magnetic separator being formed from bar magnets, the bar magnets consisting of an austenitic steel sleeve and a magnetic material present within the sleeve, and the sleeve being bonded to the magnetic material in an undetachable manner, wherein the sleeves have direct contact to the water-absorbing polymer particles and the water-absorbing polymer particles comprise at least one surfactant,
   wherein the moisture content of the water-absorbing polymer particles is increased upstream of the magnetic separator.

2. The process according to claim 1, wherein the product mass flow has a temperature of 30 to 90° C.

3. The process according to claim 1, wherein the water-absorbing polymer particles in the product mass flow have a moisture content of 1 to 20% by weight.

4. The process according to claim 1, wherein an areal loading of the magnetic separator is 2 to 15 g/cm$^2$s.

5. The process according to claim 1, wherein the bar magnets have a diameter of 5 to 30 mm.

6. The process according to claim 1, wherein a distance between the bar magnets is from 5 to 30 mm.

7. The process according to claim 1, wherein at least 95% by weight of the water-absorbing polymer particles have a particle size of at least 150 μm.

8. The process according to claim 1, wherein at least 95% by weight of the water-absorbing polymer particles have a particle size of at most 600 μm.

9. The process according to claim 1, wherein the water-absorbing polymer particles have a centrifuge retention capacity of at least 15 g/g.

10. The process according to claim 1, wherein the water-absorbing particles are surface postcrosslinked and the surfactant is added to the water-absorbing particles with a surface postcrosslinker.

11. The process according to claim 10, wherein an amount of the surfactant, based on the water-absorbing polymer particles, is 0.001% to 0.1%, by weight.

12. A process for producing water-absorbing polymer particles by polymerizing a monomer solution or suspension comprising
- a) at least one ethylenically unsaturated monomer which bears an acid group and may be at least partly neutralized,
- b) at least one crosslinker,
- c) at least one initiator,
- d) optionally one or more ethylenically unsaturated monomer copolymerizable with the monomer specified under a), and
- e) optionally one or more water-soluble polymer, metallic impurities being removed from a product mass flow comprising water-absorbing polymer particles by a magnetic separator, the magnetic separator being formed from bar magnets, the bar magnets consisting of an austenitic steel sleeve and a magnetic material present within the sleeve, and the sleeve being bonded to the magnetic material in an undetachable manner, wherein the sleeves have direct contact to the water-absorbing polymer particles and the water-absorbing polymer particles comprise at least one surfactant, wherein an areal loading of the magnetic separator is 2 to 15 $g/cm^2 s$.

* * * * *